United States Patent
Shi et al.

(10) Patent No.: US 7,835,712 B1
(45) Date of Patent: Nov. 16, 2010

(54) APPARATUS AND METHODS FOR PROVIDING MULTI-BAND OPERATION IN A MOBILE COMPUTING DEVICE

(75) Inventors: Jianxiong Shi, Pleasanton, CA (US); Isabel Mahe, Los Altos, CA (US)

(73) Assignee: Palm, Inc., Sunnyvale, CA (US)

( * ) Notice: Subject to any disclaimer, the term of this patent is extended or adjusted under 35 U.S.C. 154(b) by 940 days.

(21) Appl. No.: 11/613,086

(22) Filed: Dec. 19, 2006

(51) Int. Cl.
*H04B 1/18* (2006.01)

(52) U.S. Cl. .............. 455/168.1; 455/188.1; 455/161.1; 455/176.1; 370/395

(58) Field of Classification Search .............. 455/168.1, 455/188.1, 161.1, 176.1, 180.1, 433, 13.3; 370/393.5, 466
See application file for complete search history.

(56) References Cited

U.S. PATENT DOCUMENTS

| | | | |
|---|---|---|---|
| 5,337,344 A * | 8/1994 | Alvesalo ..................... 455/403 |
| 5,557,654 A * | 9/1996 | Maenpaa ..................... 455/411 |
| 5,862,481 A * | 1/1999 | Kulkarni et al. ........... 455/432.2 |
| 5,960,354 A * | 9/1999 | Einola ........................ 455/454 |
| 6,101,379 A * | 8/2000 | Rahman et al. ............. 455/406 |
| 6,167,250 A * | 12/2000 | Rahman et al. ............. 455/406 |
| 6,389,269 B1 * | 5/2002 | Nanni et al. .................. 455/93 |
| 6,738,023 B2 * | 5/2004 | Scott et al. ............ 343/700 MS |
| 6,748,219 B2 * | 6/2004 | Jokinen ....................... 455/446 |
| 6,754,508 B1 * | 6/2004 | Pau .......................... 455/552.1 |
| 7,092,716 B2 * | 8/2006 | Nizri et al. .................. 455/448 |
| 7,580,528 B2 * | 8/2009 | Farley et al. ................. 380/270 |
| 7,596,378 B1 * | 9/2009 | Nizri et al. .................. 455/448 |
| 2002/0068574 A1 * | 6/2002 | Vestergaard et al. ........ 455/445 |
| 2002/0102980 A1 * | 8/2002 | Jokinen ....................... 455/450 |
| 2004/0075608 A1 * | 4/2004 | Scott et al. ............ 343/700 MS |
| 2004/0233930 A1 | 11/2004 | Colby, Jr. |
| 2005/0064869 A1 * | 3/2005 | Ansorge .................... 455/435.2 |
| 2005/0129239 A1 * | 6/2005 | Farley et al. ................. 380/270 |
| 2006/0135195 A1 | 6/2006 | Leinonen et al. |
| 2006/0160537 A1 | 7/2006 | Buckley et al. |
| 2006/0160538 A1 * | 7/2006 | Hwang .................... 455/435.2 |
| 2006/0229090 A1 | 10/2006 | LaDue |
| 2007/0286112 A1 * | 12/2007 | Prakash et al. .............. 370/319 |
| 2007/0297398 A1 * | 12/2007 | Loyet ......................... 370/382 |
| 2008/0136611 A1 * | 6/2008 | Benco et al. ............. 340/426.3 |

(Continued)

FOREIGN PATENT DOCUMENTS

WO 2008077025 A1 6/2008

*Primary Examiner*—Minh D Dao
(74) *Attorney, Agent, or Firm*—Kacvinsky Daisak, PLLC

(57) ABSTRACT

Various embodiments for providing multi-band operation in a mobile computing device are described. In one or more embodiments, a mobile computing device may be arranged to support quad-band GSM communication in the GSM-850, GSM-900, GSM-1800, and GSM-1900 frequency bands. The mobile computing device may be arranged to determine a starting frequency band based on the home country and home network. By using the determined starting frequency band associated with the home country and home network of the user, fewer and/or shorter delays may be experienced when searching for and acquiring an available frequency. Once a network search is completed, the mobile computing device may be arranged to determine whether a network can be found in current frequency band pair for normal service, to disconnect from the acquired network if normal service is not supported, and to intelligently search for an available frequency in a different frequency band. Other embodiments are described and claimed.

15 Claims, 2 Drawing Sheets

U.S. PATENT DOCUMENTS

| | | |
|---|---|---|
| 2008/0318569 A1* | 12/2008 | MacNamara et al. ........ 455/433 |
| 2009/0129371 A1* | 5/2009 | Bishay ....................... 370/352 |
| 2009/0156231 A1* | 6/2009 | Versteeg et al. .......... 455/456.1 |
| 2009/0156253 A1* | 6/2009 | Shi et al. .................... 455/558 |
| 2009/0209234 A1* | 8/2009 | Bright et al. ............. 455/412.2 |

* cited by examiner

200

```
IDENTIFY A HOME NETWORK AND
A HOME COUNTRY ASSOCIATED WITH
A MOBILE COMPUTING DEVICE
202
```

```
DETERMINE A STARTING FREQUENCY BAND
BASED ON THE HOME COUNTRY AND
THE HOME NETWORK
204
```

```
SEARCH FOR AN AVAILABLE FREQUENCY
WITHIN THE STARTING FREQUENCY BAND
206
```

```
DETERMINE WHETHER ACQUIRED NETWORK
DOES NOT SUPPORT NORMAL SERVICE
302
```

```
TERMINATE CONNECTION TO ACQUIRED
NETWORK IF NORMAL SERVICE
IS NOT SUPPORTED
304
```

```
SEARCH FOR AN AVAILABLE FREQUENCY
WITHIN A DIFFERENT FREQUENCY BAND
306
```

APPARATUS AND METHODS FOR PROVIDING MULTI-BAND OPERATION IN A MOBILE COMPUTING DEVICE

BACKGROUND

A mobile computing device such as a combination handheld computer and mobile telephone or smart phone generally may provide voice and data communications functionality, as well as computing and processing capabilities. In some cases, a smart phone may support communication over a Global System for Mobile Communications (GSM) network. In general, four frequency bands are used by most GSM mobile computing devices: the 850 MHz frequency band (GSM-850), the 900 MHz frequency band (GSM-900), the 1800 MHz frequency band (GSM-1800), and the 1900 MHz frequency band (GSM-1900), as defined by the European Telecommunications Standards Institute (ETSI).

In the United States, Canada, and many other countries in the Americas, GSM-850 and GSM-1900 are used for GSM service. In most international countries, however, GSM-900 and GSM-1800 are used for GSM service. A GSM mobile computing device may be configured to operate using only certain frequency bands such as GSM-850 and/or GSM-1900, if sold in the United States for example. While the 850 MHz band is close to the 900 MHz band and the 1900 MHz band is close to the 1800 MHz band, a mobile computing device configured to work using only GSM-850 and/or GSM-1900 will not work in the 900 MHz frequency band or the 1800 MHz frequency band. As a result, the mobile computing device of an international traveler often may be incompatible with the frequency band or frequency band pair used at the destination.

Many frequency-compatibility problems may be avoided through the use of a multi-band mobile computing device that supports background scanning and switching among different frequency bands. Supporting multiple frequency bands, however, may result in long delays, high roaming charges, and/or device lock-up when searching for an available or preferred frequency band. Accordingly, there exists the need for an improved apparatus and methods for providing multi-band operation in a mobile computing device.

BRIEF DESCRIPTION OF THE DRAWINGS

FIG. 2 illustrates a logic flow in accordance with one or more embodiments.

FIG. 3 illustrates a logic flow in accordance with one or more embodiments.

DETAILED DESCRIPTION

Figure 1:
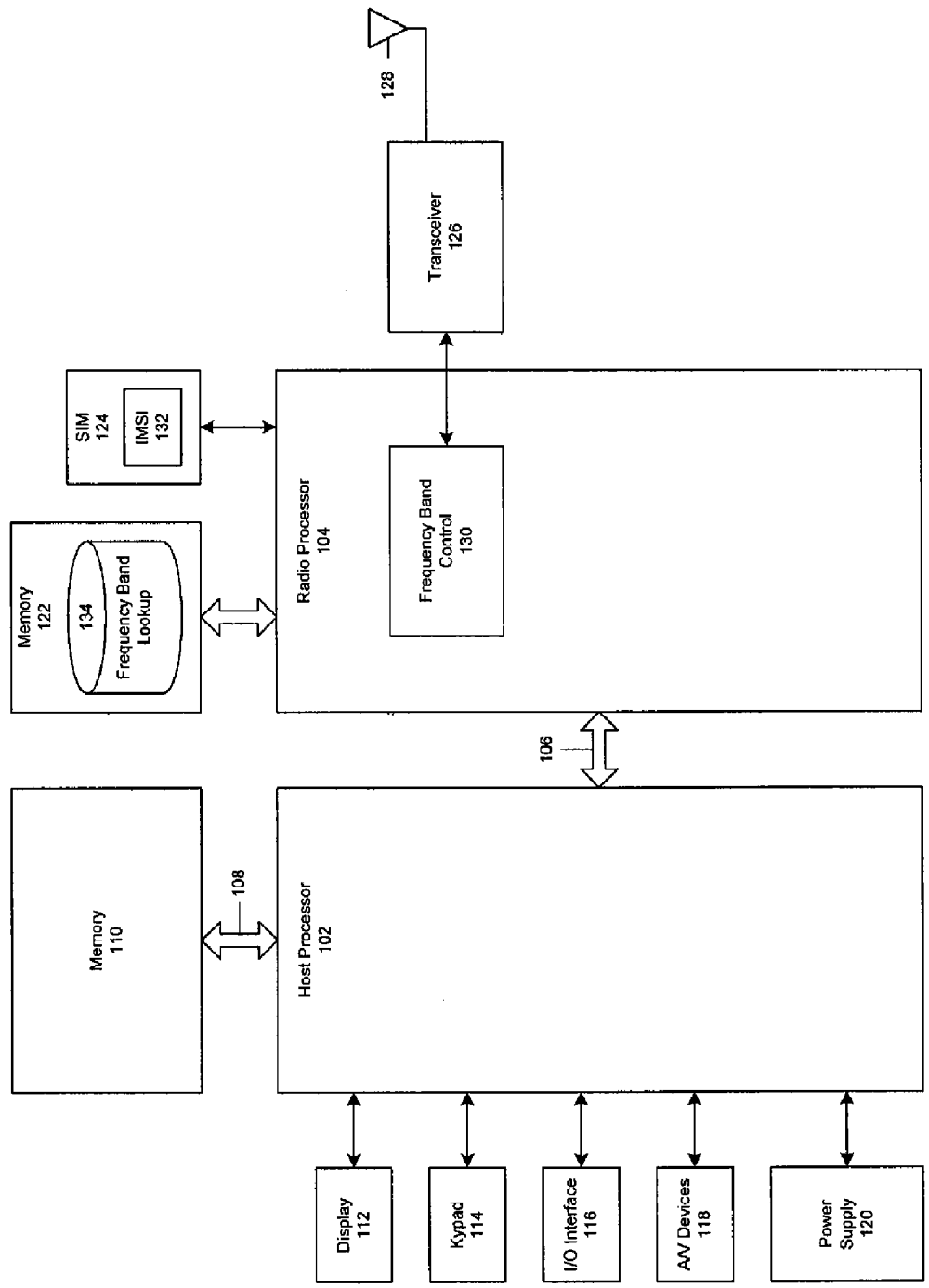
FIG. 1 illustrates a mobile computing device in accordance with one or more embodiments.

Various embodiments are directed to providing multi-band operation in a mobile computing device. In one or more embodiments, the mobile computing device may be arranged to support quad-band GSM communication in the GSM-850, GSM-900, GSM-1800, and GSM-1900 frequency bands. In various implementations, the mobile computing device may be arranged to determine a starting frequency band based on the home country and home network. By using the determined starting frequency band associated with the home country and home network of the user, fewer and/or shorter delays may be experienced when searching for and acquiring an available frequency. Once a network has been acquired, the mobile computing device may be arranged to determine whether an acquired network does not support normal service, to disconnect from the acquired network if normal service is not supported, and to intelligently search for an available frequency in a different frequency band.

FIG. 1 illustrates a mobile computing device 100 in accordance with one or more embodiments. The mobile computing device 100 may be implemented as a combination handheld computer and mobile telephone, sometimes referred to as a smart phone. Examples of smart phones include, for example, Palm® products such as Palm® Treo™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

The mobile computing device 100 may provide voice communications functionality in accordance with a GSM cellular radiotelephone system. In various embodiments, the mobile computing device 100 may be implemented as a quad-band wireless device supporting GSM-850, GSM-900, GSM-1800, and GSM-1900.

In the United States, Canada, and many other countries in the Americas, GSM-850 and GSM-1900 are used for GSM service. GSM-850 uses frequency range 824-849 MHz (uplink) and frequency range 869-894 MHz (downlink). GSM-850 is sometimes referred to as cellular. GSM-1900 uses frequency range 1850-1910 MHz (uplink) and frequency range 1930-1990 MHz (downlink). GSM-1900 is sometimes referred to as Personal Communications Service (PCS).

In most international countries, GSM-900 and GSM-1800 are used for GSM service. GSM-900 uses frequency range 890-915 MHz (uplink) and frequency range 935-960 MHz (downlink). Extended GSM (E-GSM), which uses frequency range 880-915 MHz (uplink) and frequency range 925-960 MHz (downlink), and Railways GSM (GSM-R), which uses frequency range 876-915 MHz (uplink) and 921-960 MHz (downlink), are variants included in the GSM-900 specification that provide extended coverage and additional channels. GSM-1800 uses frequency range 1710-1785 MHz (uplink) and 1805-1880 MHz (downlink). GSM-1800 is sometimes referred to as Digital Cellular System (DCS).

Although some embodiments may be described in the context of GSM voice communication for purposes of illustration, it is worthy to note that the mobile computing device 100 may implement voice communications functionality in accordance with other types of cellular radiotelephone systems which are consistent with the described embodiments. Examples of other cellular radiotelephone systems may include Code Division Multiple Access (CDMA) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Universal Mobile Telephone System (UMTS) systems, CDMA-2000, and so forth.

In addition to voice communications functionality, the mobile computing device 100 may be arranged to provide wireless wide area network (WWAN) data communications functionality with General Packet Radio Service (GPRS) systems (GSM/GPRS), Enhanced Data Rates for Global Evolution (EDGE) systems, and so forth.

Although some embodiments may be described in the context of GSM data communication for purposes of illustration, it is worthy to note that the mobile computing device 100 may implement data communications functionality in accordance with other types of cellular radiotelephone systems which are consistent with the described embodiments. Examples of other cellular radiotelephone systems offering data communications services may include UMTS systems, High Speed Downlink Packet Access (HSDPA) systems, High Speed Uplink Packet Access (HSUPA), EV-DO systems, Evolution For Data and Voice (EV-DV) systems, CDMA/1xRTT systems, and so forth.

The mobile computing device 100 also may be arranged to provide wireless local area network (WLAN) data communications functionality in accordance with one or more WLAN systems. Examples of suitable WLAN systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 100 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electro-magnetic induction (EMI) techniques. An example of EMI techniques may include passive or active radio-frequency identification (RFID) protocols and devices.

As shown in the embodiment of FIG. 1, the mobile computing device 100 may comprise a dual-processor architecture including a host processor 102 and a radio processor 104. The host processor 102 may be arranged to provide processing or computing resources to the mobile computing device 100. The radio processor 104 may be responsible for performing various voice and data communications operations for the mobile computing device 100 such as transmitting and receiving voice and data information over one or more wireless communications channels. In various implementations, the host processor 102 and the radio processor 104 may be arranged to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth. Although some embodiments may be described as comprising a dual-processor architecture for purposes of illustration, it is worthy to note that the mobile computing device 100 may comprise any suitable processor architecture and/or any suitable number of processors consistent with the described embodiments.

The host processor 102 may be responsible for executing various software programs such as system programs and application programs to provide computing and processing operations for the mobile computing device 100. System programs generally may assist in the running of the mobile computing device 100 and may be directly responsible for controlling, integrating, and managing the individual hardware components of the computer system. Examples of system programs may include, without limitation, an operating system (OS), device drivers, programming tools, utility programs, software libraries, application programming interfaces (APIs), and so forth. The mobile computing device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Application programs generally may allow a user to accomplish one or more specific tasks. Examples of application programs may include, without limitation, one or more messaging applications (e.g., telephone, voicemail, facsimile, e-mail, IM, SMS, MMS, video conferencing), web browser applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. In various implementations, the application programs may provide one or more graphical user interfaces (GUIs) to communicate information between the mobile computing device 100 and a user. In some embodiments, application programs may comprise upper layer programs running on top of the OS of the host processor 102 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

The host processor 102 may be implemented as a host central processing unit (CPU) using any suitable processor or logic device, such as a as a general purpose processor. Although some embodiments may be described with the host processor 102 implemented as a CPU or general purpose processor by way of example, it may be appreciated that the embodiments are not limited in this context. For example, the host processor 102 may comprise, or be implemented as, a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 102 may be coupled through a memory bus 108 to a memory 110. The memory bus 108 may comprise any suitable interface and/or bus architecture for allowing the host processor 102 to access the memory 110. Although the memory 110 may be shown as being separate from the host processor 102 for purposes of illustration, it is worthy to note that in various embodiments some portion or the entire memory 110 may be included on the same integrated circuit as the host processor 102. Alternatively, some portion or the entire memory 110 may be disposed on an integrated circuit or other medium (e.g., hard disk drive) external to the integrated circuit of host processor 102. In various embodiments, the mobile computing device 100 may comprise an expansion slot to support a multimedia and/or memory card, for example.

The memory 110 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 100 may comprise a display 112 coupled to the host processor 102. The display 112 may comprise any suitable visual interface for displaying content to a user of the mobile computing device 100. In one embodiment, for example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

The mobile computing device 100 may comprise an alphanumeric keypad 114 coupled to the host processor 102. The keypad 114 may comprise, for example, a QWERTY key layout and an integrated number dial pad. The mobile computing device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth.

The mobile computing device 100 may comprise an input/output (I/O) interface 116 coupled to the host processor 102. The I/O interface 116 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, mobile computing device 100 may be arranged to transfer and/or synchronize information with the local computer system.

The host processor 102 may be coupled to various audio/video (A/V) devices 118 that support A/V capability of the mobile computing device 100. Examples of A/V devices 118 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 120 arranged to supply and manage power to the elements of the mobile computing device 100. In various embodiments, the power supply 120 may be implemented by a rechargeable battery, such as a removable and rechargeable lithium ion battery to provide direct current (DC) power, and/or an alternating current (AC) adapter to draw power from a standard AC main power supply.

The mobile computing device 100 may comprise a memory 122 coupled to the radio processor 104. The memory 122 may be implemented using one or more types of machine-readable or computer-readable media capable of storing data such as volatile memory or non-volatile memory, removable or non-removable memory, erasable or non-erasable memory, writeable or re-writeable memory, and so forth. The memory 122 may comprise, for example, flash memory and secure digital (SD) RAM. Although the memory 122 may be shown as being separate from and external to the radio processor 104 for purposes of illustration, it is worthy to note that in various embodiments some portion or the entire memory 122 may be included on the same integrated circuit as the radio processor 104.

The mobile computing device 100 may comprise a subscriber identity module (SIM) card 124 coupled to the radio processor 104. The SIM card 124 may comprise, for example, a removable or non-removable smart card arranged to encrypt voice and data transmissions and to store user-specific data for allowing a voice or data communications network to identify and authenticate the user. The SIM card 124 also may store data such as personal settings specific to the user. In some embodiments, the SIM card 124 may comprise an UMTS USIM card or a CDMA RUIM card.

As mentioned above, the radio processor 104 may perform voice and/or data communication operations for the mobile computing device 100. For example, the radio processor 104 may be arranged to communicate voice information and/or data information over one or more assigned frequency bands of a wireless communication channel. In various embodiments, the radio processor 104 may be implemented as a communications processor using any suitable processor or logic device, such as a modem processor or baseband processor. Although some embodiments may be described with the radio processor 104 implemented as a modem processor or baseband processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments.

In various embodiments, the radio processor 104 may perform analog and/or digital baseband operations for the mobile computing device 100. For example, the radio processor 104 may perform digital-to-analog conversion (DAC), analog-to-digital conversion (ADC), modulation, demodulation, encoding, decoding, encryption, decryption, and so forth.

As shown in FIG. 1, the mobile computing device 100 may comprise a transceiver module 126 coupled to the radio processor 104. The transceiver module 126 may comprise one or more transceivers or components arranged to communicate using different types of protocols, communication ranges, operating power requirements, RF sub-bands, information types (e.g., voice or data), use scenarios, applications, and so forth. In various embodiments, the transceiver module 126 may comprise one or more transceivers arranged to support voice communication for a cellular radiotelephone system such as a GSM system. The transceiver module 126 also may comprise one or more transceivers arranged to perform data communications in accordance with one or more wireless communications protocols such as WWAN protocols (e.g., GSM/GPRS protocols, EDGE protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth. In some embodiments, the transceiver module 126 may comprise a Global Positioning System (GPS) transceiver to support position determination and/or location-based services.

The transceiver module 126 generally may be implemented using one or more chips as desired for a given implementation. Although the transceiver module 126 may be shown as being separate from and external to the radio processor 104 for purposes of illustration, it is worthy to note that in various embodiments some portion or the entire transceiver module 126 may be included on the same integrated circuit as the radio processor 104. In some implementations, certain transceivers (e.g., WiFi, Bluetooth, etc.) or components may be controlled or integrated with the host processor 102. The embodiments are not limited in this context.

The mobile computing device 100 may comprise an antenna system 128 for transmitting and/or receiving electrical signals. As shown, the antenna system 128 may be coupled to the radio processor 104 through the transceiver module 126. The antenna system 128 may comprise or be implemented as one or more internal antennas and/or external antennas.

The mobile computing device 100 may be implemented as a multi-band device arranged to support multiple frequency bands. In one or more embodiments, the mobile computing device 100 may comprise a quad-band GSM device supporting GSM communication in the GSM-850, GSM-900, GSM-1800, and GSM-1900 frequency bands. When implemented within a quad-band GSM device, the transceiver module 126 may enable GSM communication in the GSM-850, GSM-900, GSM-1800, and GSM-1900 frequency bands. Although some embodiments may be described in the context of GSM communication for purposes of illustration, the mobile computing device 100 may be arranged to operate in accordance with other types of cellular systems (e.g., UMTS) which are consistent with the described embodiments.

The mobile computing device 100 may comprise a frequency band control module 130. In various embodiments, the frequency band control module 130 may be implemented by the host processor 102, the radio processor 104, or combination thereof. In some implementations, the frequency band control module may be coupled to the transceiver module 126. In one or more embodiments, the frequency band control module 130 may be arranged to search for and acquire an available frequency supported by the mobile computing device 100. The frequency band control module 130 may comprise, for example, hardware and/or software such as frequency band control logic (e.g., instructions, data, and/or code) to be executed by a logic device (e.g., radio processor 104). The logic may be stored internally or externally to the logic device on one or more types of computer-readable storage media.

The frequency band control module 130 may be arranged to access the SIM card 124 of the mobile computing device 100. In one or more embodiments, the frequency band control module 130 may retrieve a unique identity code associated with the user of the mobile computing device 100. The unique identity code may comprise, for example, an International Mobile Subscriber Identity (IMSI) 132 conforming to International Telecommunication Union (ITU) standards. The IMSI 132 may be a unique number (e.g., fifteen digit number) associated with a particular GSM or UMTS network mobile user. The IMSI 132 may comprise a mobile country code (MCC), a Mobile Network Code (MNC), and a unique mobile station identification number (MSIN) within the customer base of the user's home network. The IMSI 132 may be used, for example, to determine subscriber contracts indicating whether the subscriber of a particular home network has permission and/or roaming agreements to use one or more outside networks.

The frequency band control module 130 may be arranged to identify a home country and home network associated with the user and/or the mobile computing device 100. In one or more embodiments, the frequency band control module 130 may identify the home country and home network from the unique identity code (e.g., IMSI 132). For example, the frequency band control module 130 may identify a specific country from the MCC and a specific network from the MNC of the IMSI 132. In various implementations, the frequency band control module 130 may be arranged to retrieve the IMSI 132 from the SIM card 124 and to identify the home country and home network of the user while the radio is off and/or prior to performing a search within one or more frequency bands supported by the mobile computing device 100.

The frequency band control module 130 may be arranged to access a frequency band lookup database 134. The frequency band lookup database 134 may comprise any type of data structure (e.g., array, file, table, record) and may be implemented by various types of storage media (e.g., memory 122). In one or more embodiments, the frequency band lookup database 134 may be arranged to store one or more frequency band lookup tables associating particular starting frequency band information with various countries and networks. The starting frequency band information may comprise, for example, a particular starting frequency band (e.g., GSM-1900) or frequency band pair (e.g., GSM 850/1900) associated with a specific network (e.g., Cingular Wireless) available within a specific country (e.g., United States). In various implementations, the frequency band lookup database 134 may be structure to associate the starting frequency band information with particular MCCs and MNCs.

In general, the frequency band lookup database 134 will contain starting frequency band information for various countries and networks prior to the first use of the mobile computing device 100 by a purchaser. While the number of networks and countries included in the frequency band lookup database 134 may vary, the starting frequency band information typically will be as comprehensive as possible to support worldwide use of the mobile computing device 100. In some cases, the frequency band lookup database 134 may be populated with the starting frequency information at the time of manufacture or point of sale of the mobile computing device 100. It can be appreciated that, in some cases, the frequency band lookup database 134 may be updated by receiving and/or downloading the most currently available information for the various countries and networks.

The frequency band control module 130 may be arranged to use the frequency band lookup database 134 to determine a particular starting frequency band for which to search. The particular starting frequency band may be determined, for example, based on the home country and home network associated with the user and/or the mobile computing device 100. In one or more embodiments, the frequency band control module 130 may determine the particular starting frequency band from the frequency band lookup database 134 based the MCC and MNC of the IMSI 132.

The frequency band control module 130 may be arranged to begin searching for an available frequency using the determined starting frequency band. It can be appreciated that by using the determined starting frequency band associated with the home country or home network of the user, the frequency band control module 130 may experience fewer and/or shorter delays when searching for and acquiring an available frequency. In addition, there is less chance of incurring roaming charges by connecting to an outside network rather than the home network of the user when available. In one or more embodiments, the frequency band control module 130 may be arranged to detect whether a use of the mobile computing device 100 is a first or "out-of-box" use upon power up and to determine a particular starting frequency band prior to performing an initial search for an available frequency.

In some implementations, the frequency band control module 130 may be arranged to set, reset, and/or override a default frequency band of the mobile computing device 100 with the determined starting frequency band. For example, if manufactured in the United States, the mobile computing device 100 may be configured to begin searching for an available frequency beginning with the GSM-1900 frequency band by default. In the event that the default frequency band is not supported where the mobile computing device 100 is first used, the mobile computing device 100 may undertake an exhaustive and unsuccessful search within one or more unsupported frequency bands before eventually finding an available frequency resulting in long delays and an overall poor "out-of-box" experience for the user.

The mobile computing device 100 may be arranged to support scanning and switching among different frequency bands. In one or more embodiments, the mobile computing device 100 may comprise a quad-band GSM device supporting background scanning and switching among the GSM-850, GSM-900, GSM-1800, and GSM-1900 frequency bands. When implemented within a quad-band GSM device, the transceiver module 126 may enable the scanning of and switching among the GSM-850, GSM-900, GSM-1800, and GSM-1900 frequency bands. Although some embodiments may be described in the context of GSM communication for purposes of illustration, the mobile computing device 100 may be arranged to operate in accordance with other types of cellular systems (e.g., UMTS) which are consistent with the described embodiments.

In one or more embodiments, the frequency band control module 130 may be arranged to control the continuous or periodic background scanning of other frequency bands supported by the mobile computing device 100 after an available frequency band is found and/or acquired. The frequency band control module 130 also may be configured to control the switching from an acquired frequency to another available frequency that provides better coverage in the event that the current frequency is or becomes unable to support normal service. For example, if the mobile computing device 100 locks into a frequency within the GSM-1900 frequency band, the frequency band control module 130 may perform background scanning of and switching to a frequency within the GSM-850, GSM-900, and/or GSM-1800 frequency bands. In various implementations, within each band pair (900/1800 or 850/1900), the radio behavior is specified to be fully automatic and to support background scanning such that when a search in other frequency band is ongoing, the mobile computing device 100 is still operating in current frequency band to keep a network connection.

In some cases, the frequency band control module 130 may be arranged to search for one or more frequency bands in which the mobile computing device 100 previously had operated. For example, if the mobile computing device 100 is powered down in a particular frequency band, the frequency band control module 130 may remember that particular frequency band when the mobile computing device 100 is powered up. Upon power up, the frequency band control module 130 may begin searching for an available frequency band starting with the most recent frequency band in which the mobile computing device 100 had operated. In addition, the home network of the user may provide enhanced network searching (ENS) features which disable or disallow manual frequency band searching such that automatic frequency band searching is performed without user intervention.

In such cases, however, there is a possibility that the mobile computing device 100 could experience device lock-up unless preventative measures are employed. It can be appreciated that some countries, such as Thailand, provide overlapping coverage for GSM services utilizing multiple frequency bands (e.g., GSM-900, GSM-1800, and GSM-1900), and that this situation may cause behavioral problems with the mobile computing device 100 for international travelers.

For example, if the mobile computing device 100 is powered down in the United States after operating in the PCS frequency band, and then powered up in Thailand, the frequency band control module 130 may begin searching for an available frequency starting with the PCS frequency band. Because there is PCS coverage in Thailand, the mobile computing device 100 may find and lock to an available frequency within the PCS frequency band when powered up. However, if the user is not a local subscriber to the PCS network or if the PCS network in Thailand does not have a roaming agreement with the home network of the user, the mobile computing device 100 may be unable to make and receive normal service voice and/or data calls. Without a subscription or roaming agreement, the mobile computing device 100 may find and lock into a PCS network that provides only emergency services (e.g., 911 calls) and does not support normal service voice and/or data calls. The mobile computing device 100 could then lock up and not be able to operate other than for emergency calls.

In one or more embodiments, the frequency band control module 130 may be arranged to determine whether an acquired network does not support normal service, and to exit or disconnect from the acquired network if normal service is not supported. In various implementations, the frequency band control module 130 may be arranged to receive an indication of network service from a registration status message received from the radio processor 104. In some cases, the frequency band control module 130 may be arranged to query the radio processor 104 to retrieve the registration status message. In other cases, the radio processor 104 may send a registration status message to the frequency band control module 130 whenever there is a change in the registration status.

The registration status message may comprise, for example, a GSM attention command (AT command) message according to an ETSI standard protocol. It can be appreciated that other suitable registration status messages in accordance with an interface protocol supported by the modem processor 104 may be used consistent with the described embodiments.

When a network has been acquired but registration is unsuccessful, the frequency band control module 130 may determine that the acquired network does not support normal service and that a switch is needed. For example, if the modem processor 104 is unable to register with an acquired network, the frequency band control module 130 may terminate the connection to the network and may initiate an attempt to locate another available network. In some implementations, the frequency band control module 130 may discontinue or terminate a search within one frequency band if roaming persists for a predetermined period of time, and then perform a search of a different frequency band.

In one or more embodiments, the frequency band control module 130 may be arranged to intelligently search for an available frequency in a different frequency band. For example, the frequency band control module 130 may be arranged to determine the current location of the mobile computing device 100 based on the unsuccessfully registered network. In addition, the frequency band control module 130 may access the SIM card 124 of the mobile computing device 100 and retrieve the IMSI 132 associated with the user of the mobile computing device 100. The frequency band control module 130 may use the IMSI 132 to identify the home country and home network of the user. From such information, the frequency band control module 130 may recognize that the user is not local and may tailor the search for an available frequency in the most appropriate frequency band based on the home country, home network, and current location of the user.

FIG. 2 illustrates a logic flow 200 in accordance with one or more embodiments. The logic flow 200 may be performed by various systems and/or devices and may be implemented as hardware, software, and/or any combination thereof, as desired for a given set of design parameters or performance constraints. For example, the logic flow 200 may be implemented by a logic device (e.g., processor) and/or logic (e.g., instructions, data, and/or code) to be executed by a logic device. For purposes of illustration, and not limitation, the logic flow 200 is described with reference to FIG. 1. The embodiments are not limited in this context.

The logic flow 200 may comprise identifying a home country and home network associated with a mobile computing device (block 202). In various embodiments, the home country and home network may be obtained by retrieving a unique identity code associated with the user of the mobile computing device 100. The unique identity code may comprise and IMSI 132 stored in the SIM card 124 of the mobile computing device 100. The home country may be identified from the MCC of the IMSI 132, and the home network may be identified from the MNC of the IMSI 132. In various implementations, the frequency band control module 130 may be arranged to retrieve the IMSI 132 from the SIM card 124 and to identify the home country and home network of the user while the radio is off and/or prior to performing a search within one or more frequency bands supported by the mobile computing device 100.

The logic flow 200 may comprise determine a starting frequency band based on the home country and home network (block 204). In various embodiments, a frequency band lookup database 134 may be accessed to determine the starting frequency. The frequency band lookup database 134 may be arranged to store one or more frequency band lookup tables associating particular starting frequency band information with various countries and networks. The starting frequency band information may comprise, for example, a particular starting frequency band or frequency band pair associated with a specific network available within a specific country.

In various implementations, the frequency band lookup database 134 may be structure to associate the starting frequency band information with particular MCCs and MNCs, and the particular starting frequency band may be determined from the frequency band lookup database 134 based the MCC and MNC of the IMSI 132. In one or more embodiments, a determination may be made whether a use of the mobile computing device 100 is a first or "out-of-box" use upon power up and to determine a particular starting frequency band prior to performing an initial search for an available frequency. In some cases, a default frequency band may be set, reset, and/or overridden by with the determined starting frequency band.

The logic flow 200 may comprise searching for an available frequency within the starting frequency band (block 206). In various embodiments, by using the determined starting frequency band associated with the home country or home network of the user, fewer and/or shorter delays may be experienced when searching for and acquiring an available frequency. In addition, there is less chance of incurring roaming charges by connecting to an outside network rather than the home network of the user when available.

FIG. 3 illustrates a logic flow 300 in accordance with one or more embodiments. The logic flow 300 may be performed by various systems and/or devices and may be implemented as hardware, software, and/or any combination thereof, as desired for a given set of design parameters or performance constraints. For example, the logic flow 300 may be implemented by a logic device (e.g., processor) and/or logic (e.g., instructions, data, and/or code) to be executed by a logic device. For purposes of illustration, and not limitation, the logic flow 300 is described with reference to FIG. 1. The embodiments are not limited in this context.

The logic flow 300 may comprise determining whether an acquired network does not support normal service (block 302). In some cases, an acquired network may provide only emergency services (e.g., 911 calls) and does not support normal service voice and/or data calls. Without a subscription to or roaming agreement with the acquired network, the mobile computing device 100 could lock up and not be able to operate other than for emergency calls. In various embodiments, an indication of network service may be obtained from a registration status message received from the radio processor 104. In some implementations, the radio processor 104 may be queried to retrieve the registration status. In other implementations, the radio processor 104 may send a registration status indication whenever there is a change in the registration status. The registration status indication may comprise, for example, a GSM AT command or other suitable registration status indication in accordance with an interface protocol supported by the modem processor 104.

The logic flow 300 may comprise terminating a connection to the acquired network if no normal service can be acquired in current frequency band (pair) (block 304). In various embodiments, when a network has been acquired but registration is unsuccessful, it may be determined that the acquired network does not support normal service and that a switch is needed. In various implementations, switching may occur only after the mobile computing device 100 has exhausted all available networks in the current band-pair mode and has found that no normal service can be acquired. If the mobile computing device 100 can make an emergency call, it does not lock into that particular network. Rather, the mobile computing device 100 camps on a network with the strongest signal. If the modem processor 104 is unable to register with an acquired network, the connection to the network may be terminated.

The logic flow 300 may comprise searching for an available frequency in a different frequency band (block 306). In various embodiments, the current location of the mobile computing device 100 may be determined based on the unsuccessfully registered network. In addition, the SIM card 124 of the mobile computing device 100 may be accessed to retrieve the IMSI 132 associated with the user. The IMSI 132 may be used to identify the home country and home network of the user. From such information, a search for an available frequency in the most appropriate frequency band may be performed based on the home country, home network, and current location of the user. In some implementations, a search may be discontinued or terminated within one frequency band if roaming persists for a predetermined period of time, and then perform a search of a different frequency band.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising:
a mobile computing device arranged to support multi-band communication in multiple frequency bands, the mobile computing device comprising a frequency band control module to determine that an acquired network does not support normal service voice and data calls, to terminate a connection to the acquired network if no normal service can be acquired in a current frequency band pair, and to search for an available frequency in a different frequency band after exhausting all available networks in a current band pair and determining that no normal service can be acquired.

2. The apparatus of claim 1, the mobile computing device to support quad-band Global System for Mobile Communications (GSM) communication in the 850 MHz frequency band (GSM-850), the 900 MHz frequency band (GSM-900), the 1800 MHz frequency band (GSM-1800), and the 1900 MHz frequency band (GSM-1900) GSM-850, GSM-900, GSM-1800, and GSM-1900 frequency bands.

3. The apparatus of claim 1, the frequency band control module to obtain an indication of network service from a registration status message received from a radio processor of the mobile computing device.

4. The apparatus of claim 3, the registration status message comprising an attention (AT) command.

5. The apparatus of claim 3, the frequency band control module to determine a current location of the mobile computing device based on an unsuccessfully registered network, to identify a home country and home network associated with the mobile computing device, and to search for an available frequency in an appropriate frequency band based on the home country, home network, and current location.

6. A method comprising:
determining whether normal service for voice and data calls can be acquired from a network in a current frequency band pair for a mobile computing device arranged to support multi-band communication in multiple frequency bands;
terminating a connection to the acquired network if normal service is not supported; and
searching for an available frequency in a different frequency band after exhausting all available networks in a current band pair and determining that no normal service can be acquired.

7. The method of claim 6, comprising obtaining an indication of network service from a registration status message.

8. The method of claim 7, comprising receiving the registration status message from a radio processor of the mobile computing device.

9. The method of claim 7, the registration status message comprising an attention (AT) command.

10. The method of claim 6, comprising:
determining a current location of the mobile computing device based on an unsuccessfully registered network;

identifying a home country and home network associated with the mobile computing device; and searching for an available frequency in an appropriate frequency band based on the home country, home network, and current location.

11. A computer-readable storage medium comprising instructions that if executed enable a computing system to:

determine whether an acquired network does not support normal service voice and data calls for a mobile computing device arranged to support multi-band communication in multiple frequency bands;

terminate a connection to the acquired network if normal service is not supported; and search for an available frequency in a different frequency band.

12. The storage medium of claim 11, further comprising instructions that if executed enable a computing system to obtain an indication of network service from a registration status message.

13. The storage medium of claim 12, further comprising instructions that if executed enable a computing system to receive the registration status message from a radio processor of the mobile computing device.

14. The storage medium of claim 12, the registration status message comprising an attention (AT) command.

15. The storage medium of claim 11, further comprising instructions that if executed enable a computing system to:

determine a current location of the mobile computing device based on an unsuccessfully registered network;

identify a home country and home network associated with the mobile computing device; and search for an available frequency in an appropriate frequency band based on the home country, home network, and current location.

* * * * *